(12) United States Patent
Huber et al.

(10) Patent No.: US 8,929,180 B1
(45) Date of Patent: Jan. 6, 2015

(54) ENERGY-ASSISTED MAGNETIC RECORDING DEVICE HAVING LASER DRIVING SIGNAL AND MAGNETIC WRITE SIGNAL SHARING SAME ELECTRICAL CONDUCTOR

(71) Applicant: Western Digital Technologies, Inc., Irvine, CA (US)

(72) Inventors: William D. Huber, Hollister, CA (US); Michael L. Mallary, Sterling, MA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/870,931

(22) Filed: Apr. 25, 2013

(51) Int. Cl.
  *G11B 11/00* (2006.01)
  *G11B 13/04* (2006.01)
(52) U.S. Cl.
  CPC ..................................... *G11B 13/04* (2013.01)
  USPC .................. 369/13.33; 369/13.13; 360/244.3
(58) Field of Classification Search
  CPC .............................................. G11B 2005/0032
  USPC ...................... 369/13.33, 13.13, 13.32, 13.17
  See application file for complete search history.

(56) References Cited

U.S. PATENT DOCUMENTS

| | | | |
|---|---|---|---|
| 6,075,673 A | 6/2000 | Wilde et al. | |
| 6,097,575 A | 8/2000 | Trang et al. | |
| 6,125,014 A | 9/2000 | Riedlin, Jr. | |
| 6,125,015 A | 9/2000 | Carlson et al. | |
| 6,130,863 A | 10/2000 | Wang et al. | |
| 6,137,656 A | 10/2000 | Levi et al. | |
| 6,144,528 A | 11/2000 | Anaya-Dufresne et al. | |
| 6,147,838 A | 11/2000 | Chang et al. | |
| 6,151,196 A | 11/2000 | Carlson et al. | |
| 6,178,064 B1 | 1/2001 | Chang et al. | |
| 6,181,522 B1 | 1/2001 | Carlson | |
| 6,181,673 B1 | 1/2001 | Wilde et al. | |
| 6,229,672 B1 | 5/2001 | Lee et al. | |
| 6,236,543 B1 | 5/2001 | Han et al. | |
| 6,246,547 B1 | 6/2001 | Bozorgi et al. | |
| 6,249,404 B1 | 6/2001 | Doundakov et al. | |
| 6,330,131 B1 | 12/2001 | Nepela et al. | |
| 6,339,518 B1 | 1/2002 | Chang et al. | |
| 6,349,017 B1 | 2/2002 | Schott | |
| 6,373,660 B1 | 4/2002 | Lam et al. | |
| 6,378,195 B1 | 4/2002 | Carlson | |
| 6,522,504 B1 | 2/2003 | Casey | |
| 6,538,850 B1 | 3/2003 | Hadian et al. | |
| 6,583,953 B1 | 6/2003 | Han et al. | |
| 6,646,832 B2 | 11/2003 | Anaya-Dufresne et al. | |
| 6,661,612 B1 | 12/2003 | Peng | |
| 6,665,146 B2 | 12/2003 | Hawwa et al. | |
| 6,690,545 B1 | 2/2004 | Chang et al. | |
| 6,704,173 B1 | 3/2004 | Lam et al. | |
| 6,708,389 B1 | 3/2004 | Carlson et al. | |
| 6,717,773 B2 | 4/2004 | Hawwa et al. | |

(Continued)

*Primary Examiner* — Tan X Dinh (57) ABSTRACT

A disk drive includes a write head that includes a slider, a write transducer disposed on the slider, and a laser device affixed to the slider. The write transducer is driven by a first electrical signal that is carried on at least one of a plurality of conductive traces of a laminated flexure to which the write head is attached. The laser device is driven by a second electrical signal that is also carried by the same at least one of the plurality of conductive traces. The first signal is characterized by a first frequency, and the second electrical signal is characterized by a second frequency that is different from the first frequency.

18 Claims, 6 Drawing Sheets

(56) References Cited

U.S. PATENT DOCUMENTS

| | | |
|---|---|---|
| 6,721,142 B1 | 4/2004 | Meyer et al. |
| 6,744,599 B1 | 6/2004 | Peng et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,856,489 B2 | 2/2005 | Hawwa et al. |
| 6,873,496 B1 | 3/2005 | Sun et al. |
| 6,912,103 B1 | 6/2005 | Peng et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,117 B1 | 8/2006 | Subrahmanyam et al. |
| 7,174,622 B2 | 2/2007 | Meyer et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,729,089 B1 | 6/2010 | Hogan |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,164,858 B1 | 4/2012 | Moravec et al. |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,289,821 B1 | 10/2012 | Huber |
| 8,295,012 B1 | 10/2012 | Tian et al. |
| 8,295,013 B1 | 10/2012 | Pan et al. |
| 8,295,014 B1 | 10/2012 | Teo et al. |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 * | 3/2014 | Panitchakan et al. ...... 369/13.33 |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 2003/0035245 A1 * | 2/2003 | Shiraishi .................... 360/244.3 |
| 2007/0139818 A1 | 6/2007 | Shimazawa et al. ......... 360/126 |
| 2008/0024896 A1 * | 1/2008 | Ohta et al. ..................... 360/59 |
| 2009/0052076 A1 * | 2/2009 | Shimazawa et al. ........... 360/59 |
| 2009/0052077 A1 * | 2/2009 | Tanaka et al. .................. 360/59 |
| 2012/0044790 A1 * | 2/2012 | Shimazawa et al. ....... 369/13.33 |
| 2012/0320474 A1 * | 12/2012 | Soeno et al. .................. 360/319 |
| 2013/0229895 A1 * | 9/2013 | Shiroishi et al. ........... 369/13.33 |
| 2013/0244541 A1 | 9/2013 | Yaemglin et al. |
| 2013/0293982 A1 | 11/2013 | Huber |

* cited by examiner

ENERGY-ASSISTED MAGNETIC RECORDING DEVICE HAVING LASER DRIVING SIGNAL AND MAGNETIC WRITE SIGNAL SHARING SAME ELECTRICAL CONDUCTOR

BACKGROUND

Magnetic hard disk drives store and retrieve data in computers and other consumer electronics devices. A magnetic hard disk drive includes one or more heads that can write and read information on a corresponding magnetic surface of a spinning disk. For convenience, all heads that can write are referred to as "write heads" or "heads" herein, regardless of other devices and functions the write head may also perform (e.g. reading, micro-actuation, flying height control, touch down detection, lapping control, localized disk media heating, etc). Each write head is a sub-component of a head gimbal assembly (HGA). The HGA also includes a suspension assembly for holding the head and providing a plurality of electrical connections thereto. The suspension assembly typically includes a fragile laminated flexure to carry the electrical signals to and from the head.

The head typically comprises a slider that includes an air bearing surface (ABS) that faces the magnetic disk surface, a trailing face, and a mounting face that is opposite the ABS and that faces away from the ABS. A magnetic sensor and a plurality of head bond pads are typically disposed on the trailing face of the slider. The mounting face of the slider is typically permanently bonded to a tongue portion of the fragile laminated flexure by an adhesive, in a position such that the plurality of head bond pads are aligned with corresponding bond pads on the laminated flexure.

Conventionally, the head writes tiny magnetic transitions on the magnetic disk surface by applying sufficient magnetic field to the desired microscopic disk surface location to overcome the coercivity of the disk surface material there, and thereby change the remnant field there. However, market demand for disk drives having ever higher data storage capacity has motivated investigation into the possible use of "energy assisted" magnetic recording (EAMR), in which writing is accomplished not only by local application of a magnetic field, but also by local application of laser light for localized heating of the disk surface. EAMR may enable the writing of smaller transitions, and thereby increase the areal density of data stored on the disk surface. Most proposed EAMR technologies require the addition of a laser light source on a slider of the write head, for example bonded to the back face of the slider. EAMR is sometimes also referred to as HAMR ("heat assisted magnetic recording").

Driving the laser light source for EAMR requires electrically conductive paths or traces in the laminated flexure that connects to the write head. Conventionally, the conductive traces used to drive the laser device are additional to the other conductive traces that carry the write signal to the write head. However, space available on the flexure for additional conductive traces is limited. Moreover, the additional electrical connections required for additional conductive flexure traces increases the time to manufacture HGAs and head stacks, manufacturing scrap, and manufacturing costs, and can reduce manufacturing yield. Accordingly, there is a need in the art for improved structures and methods to drive laser devices in EAMR disk drive applications with more efficient use of space available on the laminated flexure.

Furthermore, in EAMR disk drives, and at present and future high data rates, the skew (i.e. the time lead or lag between transitions in the write signal and transitions in the signal that drives the laser device) can be undesirably frequency dependent. Yet it is important that these signals be synchronized so that the heat produced by the laser will assist the writing of magnetic transitions on the disk. Accordingly, there is a need in the art for improved structures and methods to reduce the frequency dependence of skew when driving laser devices in EAMR disk drive applications.

DESCRIPTION OF EXAMPLE EMBODIMENTS

Figure 1:
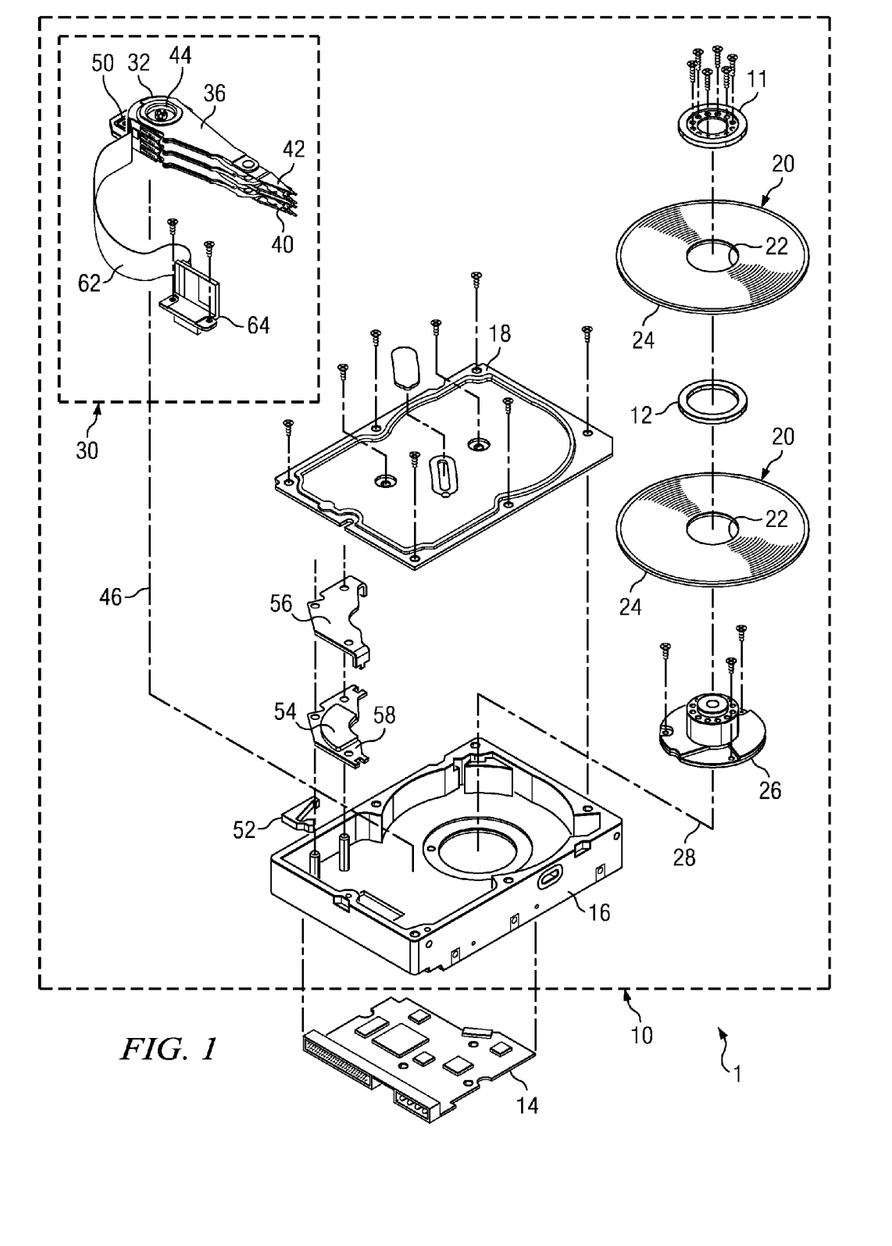
FIG. 1 is an exploded perspective view of a disk drive capable of including an embodiment of the present invention.

FIG. 1 is a perspective view of a disk drive 1 capable of including an embodiment of the present invention. The disk drive 1 includes a head disk assembly (HDA) 10 and a printed circuit board (PCB) 14. The HDA 10 includes a disk drive base 16 and a disk drive cover 18, that together enclose other components of the HDA 10. At least one disk 20 is rotably mounted to the disk drive base 16 by a spindle motor 26. The HDA 10 optionally includes one or more additional disks 20, also rotably mounted to the disk drive base 16 by spindle motor 26, with the disks 20 then separated by one or more spacer rings 12.

The disks 20 may comprise an aluminum, glass, or ceramic substrate, with the substrate optionally being coated with a NiP under-layer, at least one thin-film magnetic layer, a diamond-like amorphous carbon protective layer, and a very thin lubricant layer, for example. The disks 20 are annular in shape, having an outer periphery 24 and an inner periphery 22, and may be clamped to a rotating hub of the spindle motor 26, by a clamp 11. The rotating hub of the spindle motor 26 rotates the disks 20 about a disk axis of rotation 28.

The HDA 10 also includes a head stack assembly (HSA) 30 that includes an actuator 32 that is pivotably mounted to the disk drive base 16 by a pivot bearing 44 that is inserted as a cartridge into a bore in the actuator 32. The pivot bearing 44 allows the actuator 32 to pivot about an actuator pivot axis 46. The actuator 32 may be fabricated from aluminum, magnesium, beryllium, or stainless steel. The pivot bearing 44 may be retained in the bore by a tolerance ring or may be otherwise retained (e.g. by a snap ring, an adhesive, etc). The angular range of motion of the actuator 32 may be limited by a latch and crash stop mechanism 52. The actuator 32 includes at least one actuator arm 36 that extends away from the pivot bearing 44, and an actuator coil 50 that extends away from the pivot bearing 44 in a direction generally opposite the actuator arm 36.

The actuator coil 50 may fit in a yoke structure that optionally comprises a top plate 56 and a bottom plate 58, to form a voice coil motor (VCM). One or both of the top plate 56 and the bottom plate 58 may support a permanent magnet(s) of the VCM (e.g. permanent magnet 54). The top plate 56 and/or the bottom plate 58 preferably comprise a ferromagnetic metal so as to provide a return path for magnetic flux from the permanent magnet(s) through the yoke structure. The ferromagnetic metal yoke structure including the top plate 56 and the bottom plate 58 is preferably affixed to the disk drive base 16, for example by an adhesive, one or more fasteners, and/or magnetic attraction.

A plurality of suspension assemblies 42 may be attached to arms 36 of the actuator 32, for example by swaging. A flexible printed circuit (FPC) 62 (also known as a "flex cable") may also be attached to the actuator 32. Each of the suspension assemblies 42 may support a write head 40 that is bonded to a laminated flexure of the suspension assembly, the laminated flexure having a flexure tail that is electrically connected to the FPC 62. The FPC 62 can communicate electrical signals, via these electrical connections and via a flex bracket 64, between the flexure tails and an external electronic system that is disposed on the PCB 14.

The actuator 32, suspension assemblies 42, and FPC 62 all may be considered as components of the HSA 30. The HDA 10 may have additional components that are not shown in FIG. 1. For example, the HDA 10 may also include a conventional head loading ramp (not shown), that may be positioned adjacent the disks 20 to facilitate merging of the write heads 40 onto surfaces of the disks 20.

Figure 2:
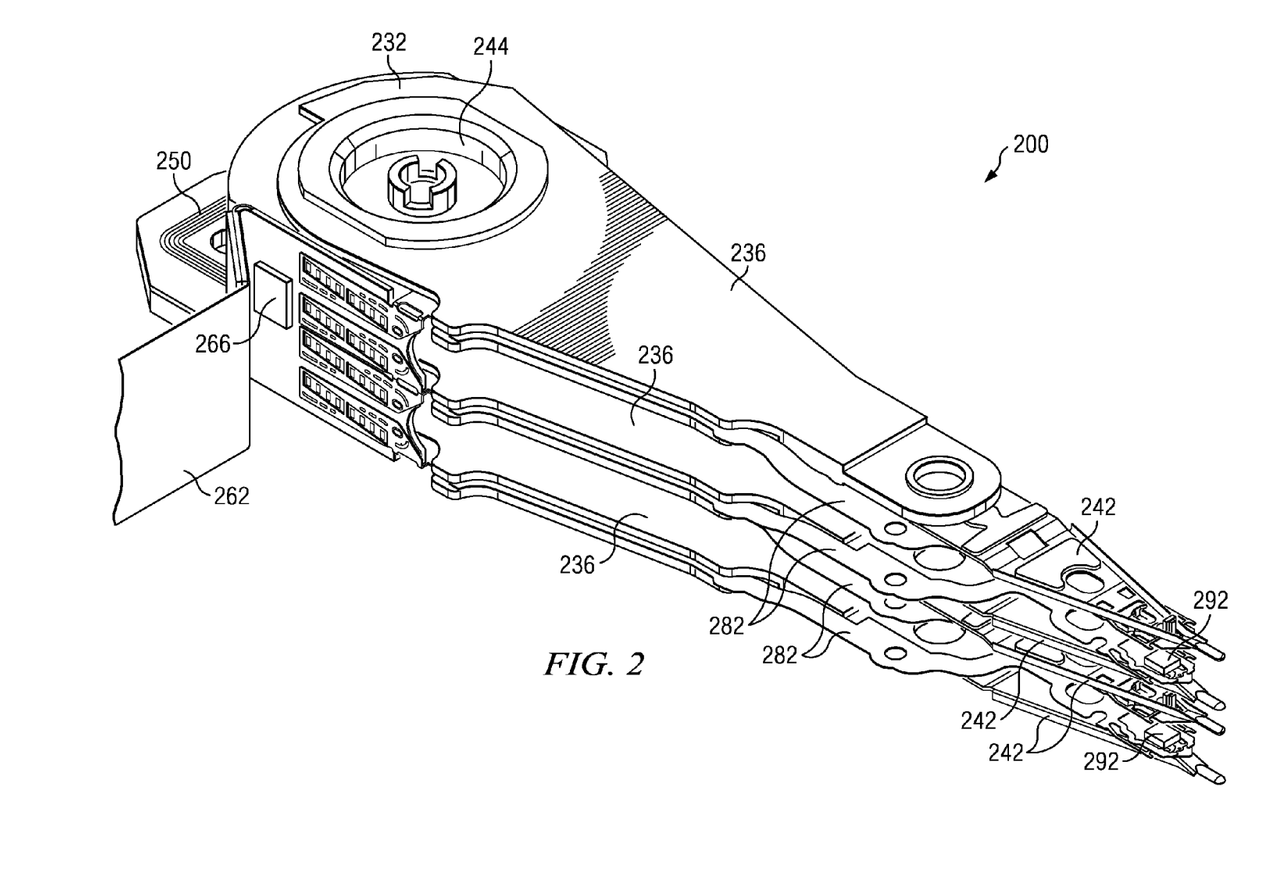
FIG. 2 is a top perspective view of a head stack assembly (HSA), capable of including an embodiment of the present invention.

FIG. 2 is a top perspective view of a head stack assembly (HSA) 200, capable of including an embodiment of the present invention. The HSA 200 includes an actuator 232 pivotably attachable to a disk drive base by a pivot bearing 244 that is inserted as a cartridge into a bore in the actuator 232. The actuator 232 may be fabricated from a suitable metal such as aluminum, magnesium, beryllium, or stainless steel, or a relatively low mass density non-metallic or composite material having sufficient stiffness. The pivot bearing 244 may be retained in the bore by a tolerance ring or may be otherwise retained (e.g. by a snap ring, an adhesive, etc). The actuator 232 includes a plurality of actuator arms 236 that extends away from the pivot bearing 244, and an actuator coil 250 that extends away from the pivot bearing 244 in a direction generally opposite the actuator arms 236.

In the embodiment of FIG. 2, a plurality of suspension assemblies 242 are shown to be attached to arms 236 of the actuator 232. Each suspension assembly 242 supports a write head 292 that is attached thereto. Specifically, each write head 292 is attached and electrically connected to a laminated flexure 282 of the suspension assembly 242. Each suspension assembly 242 is shown to be attached to one of the actuator arms 236, for example by swaging. A flexible printed circuit (FPC) 262 is also shown to be attached to the actuator 232. Each laminated flexure 282 includes a plurality of conductive traces, and each laminated flexure 282 has a flexure tail that extends to the FPC 262, where the plurality of conductive traces is connected to the FPC 262 near a pre-amplifier chip 266 of the FPC 262.

Figure 3A:
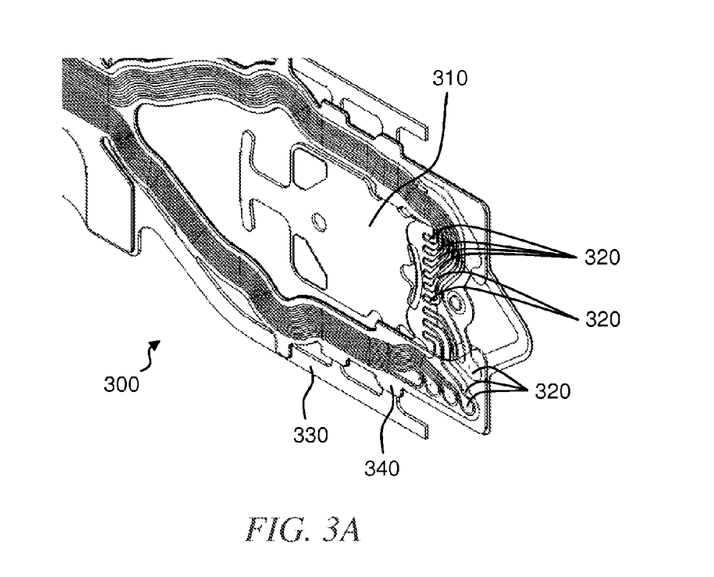
FIG. 3A depicts a distal end of a laminated flexure that is capable of use with an embodiment of the present invention.

FIG. 3A depicts the distal end of a laminated flexure 300 that is capable of use with an embodiment of the present invention. The laminated flexure 300 includes a tongue 310 on which a write head may be mounted. The laminated flexure 300 includes a patterned electrically conductive layer that, in the example embodiment of FIG. 3A, includes nine conductive traces 320. The conductive traces may comprise copper, for example. The laminated flexure may also include a structural layer 330 (e.g. stainless steel) and a dielectric layer 340 (e.g. polyimide) electrically separating the conductive traces 320 from the structural layer 330.

In the embodiment of FIG. 3A, the laminated flexure 300 extends away from the tongue 310 towards the FPC (e.g. FPC 262 of FIG. 2), i.e. the laminated flexure 300 extends to the left in the view of FIG. 3A, so that many or all of the conductive traces 320 can connect to the FPC (e.g. FPC 262 of FIG. 2). In this way, the laminated flexure 300 serves as an electrical interconnect (e.g. between the write head 292 and the FPC 262 of FIG. 2). It is contemplated that in some embodiments, certain of the conductive traces 320 may be further split and interleaved with others of the conductive traces 320 in a conventional manner to achieve desired electrical properties (e.g. impedance, inter-trace capacitance, etc).

Figure 3B:
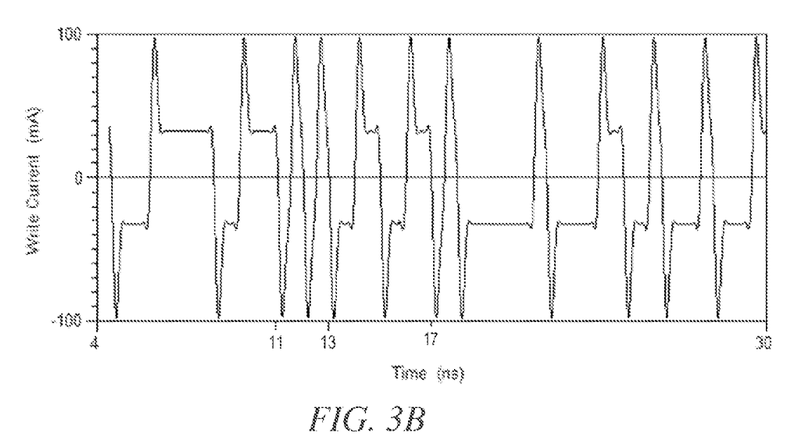
FIG. 3B depicts an example 2 Gtps write signal.

FIG. 3B depicts an example write signal, plotted as write current versus time. The write signal is considered herein to have a characteristic frequency that is the inverse of the minimum period between transitions. In this context, a "transition" may be considered to be a zero crossing that is not the result of mere noise or overshoot, and the "minimum" corresponds to periods when no transitions are absent.

For example, the write signal of FIG. 3B is depicted to have a minimum period between transitions of 0.5 nanoseconds, and so the characteristic frequency of the write signal shown in FIG. 3B is 2 Giga transitions per second (i.e. 2 Gtps). That can be visually confirmed in FIG. 3B from the 0.5 nanosecond minimum period between zero crossings (in the temporal region of the waveform between the 11 nanosecond and 13 nanosecond labels on the time axis). Note that there are longer periods between zero crossings in the write signal as shown in FIG. 3B, but such longer periods correspond to deliberately absent transitions in the write signal, and so do not correspond to the characteristic minimum period between transitions that is used to determine frequency herein.

Figure 4:
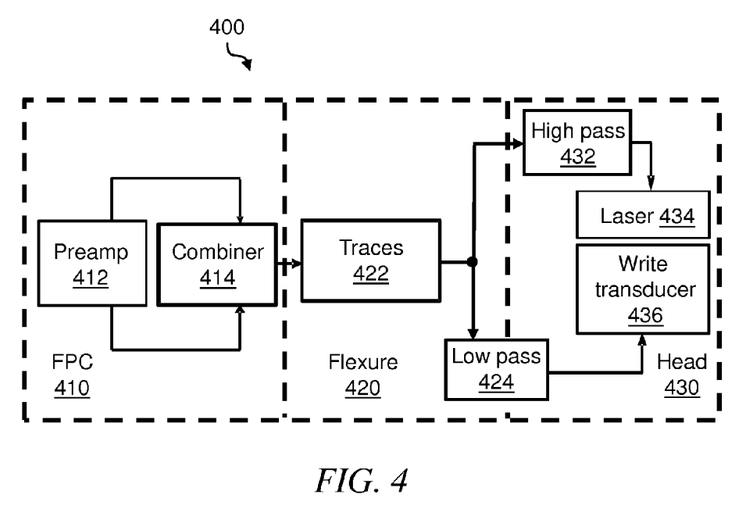
FIG. 4 is a block diagram of a circuit for driving a write transducer and a laser diode of a write head, according to an embodiment of the present invention.

FIG. 4 is a block diagram of a circuit 400 for driving a write transducer 436 and a laser device 434 (e.g. laser diode) of a write head 430, according to an embodiment of the present invention. In the example embodiment of FIG. 4, a FPC 410 includes a preamplifier chip 412 that outputs a write signal with transitions having a write characteristic frequency, and a laser driving signal with transitions having a laser characteristic frequency that is higher than the write characteristic frequency.

For example, in certain embodiments, the write characteristic frequency is preferably in the range 2 Gtps to 4 Gtps (e.g. 3 Gtps), and the laser characteristic frequency is preferably in the range 5 Gtps to 7 Gtps (e.g. 6 Gtps). In certain embodiments, the laser characteristic frequency may preferably be an integer multiple of the write characteristic frequency, for example so that writing and heating can be better synchronized. In the embodiment of FIG. 4, both the write signal and the laser driving signal (~5 V) are input to a power combiner circuit 414, for example, a conventional Wilkinson power combiner circuit.

In the example embodiment of FIG. 4, the FPC 410 includes the power combiner circuit 414, but it is contemplated that the power combiner circuit 414 may instead be located on the laminated flexure 420 adjacent the FPC 410, for example in a tail region of the flexure 420 that is bonded to the FPC 410. The power combiner circuit 414 provides for frequency duplexing the write signal and the laser driving signal (i.e. carrying both signals on the same conductor(s), first combined and then later differentiated and separated based on frequency).

In the example embodiment of FIG. 4, the combined signal output of the power combiner circuit 414 is transmitted along a laminated flexure 420 via low-impedance and high-bandwidth conductive traces 422 (e.g. ~20Ω impedance, ~12 GHz bandwidth). That is, the combined signal output of the power combiner circuit 414 is carried on at least one of the plurality of conductive traces 422, with both the high and low frequency signals being carried by the same one(s) of the plurality of conductive traces 422. The combined signal is then fed, in parallel, to a low pass filter 424, and a high pass filter 432. The low pass filter 424 is shown, in the example of FIG. 4, to partially pertain to the laminated flexure 420, and partially pertain to the write head 430. That is because the inductance of the write transducer 436 of the write head 430 can participate in the low pass filtering symbolized by low pass filter 424.

Figure 5:
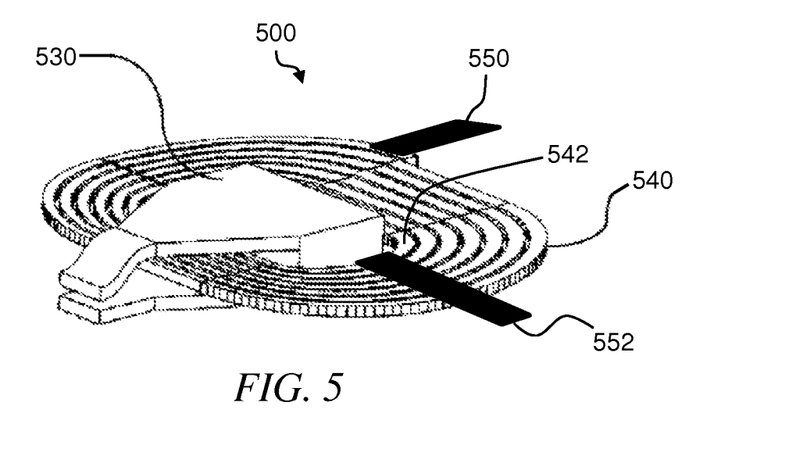
FIG. 5 is a write coil capable of use with an embodiment of the present invention.

For example, the write transducer 436, that is disposed on the slider of the write head 430, may be an inductive write transducer that includes a write coil 500 like the one shown in FIG. 5. The example write coil 500, is a pancake spiral coil with a first electrode 550 electrically connected to the outermost coil turn 540, and a cross-over strap 552 that is used as a second electrode electrically connected to the innermost coil turn 542. Although depicted in FIG. 5 with seven pancake spiral coil turns, the write coil 500 may instead be a solenoidal or toroidal coil, and/or may have fewer or more turns.

Electrical current through the turns of write coil 500 generates a magnetic flux in the writer yoke 530, which causes electrical inductance between the electrodes 550 and 552. For example, if the pancake spiral coil 500 were to have 14 turns, with the outermost turn 540 having an outer diameter of 100 microns, and with the innermost turn 542 having an inner diameter of 50 μm, with a turn thickness of 2 μm, and with a spacing between turns of 1 μm, then the write coil 500 would have an electrical inductance between the electrodes 550 and 552 of approximately 20 nH.

Referring again to FIG. 4, the output of the low pass filter 424 drives the write transducer 436 of the write head 430, and the output of the high pass filter 432 drives the laser device 434 (e.g. laser diode) of the write head 430. The low pass filter circuit 424 may be augmented by the low pass filtering effect associated with the inductance of the write transducer 436. Hence, the low pass filter circuit 424 is depicted in FIG. 4 as being located partially on the laminated flexure 420. However, it is contemplated that the low pass filter circuit 424 could instead be located wholly on the slider of the write head 430, as is the high pass filter 432 of FIG. 4.

Figure 6A:
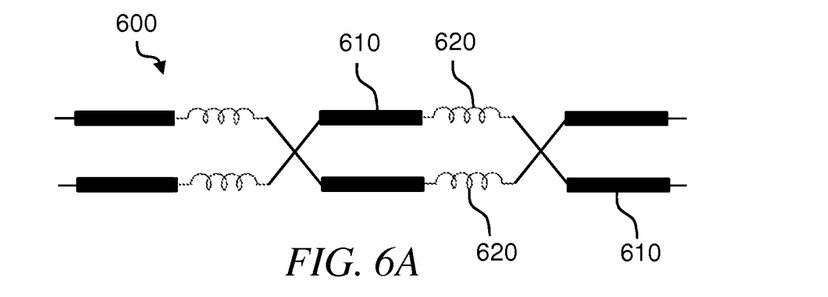
FIG. 6A is a low pass filter capable of use with an embodiment of the present invention.
Figure 6B:
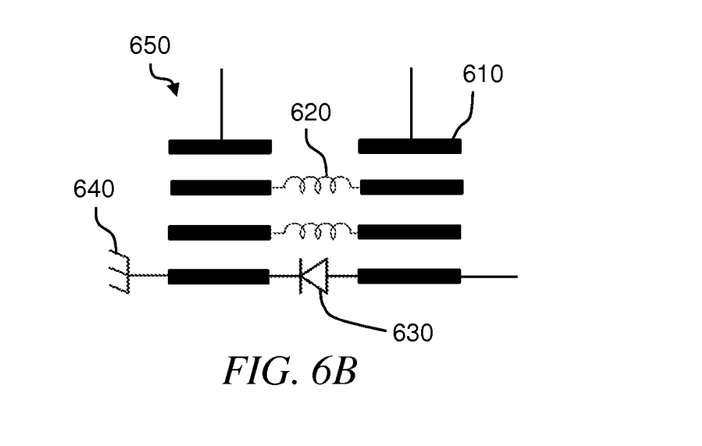
FIG. 6B is a high pass filter capable of use with an embodiment of the present invention.
Figure 7:
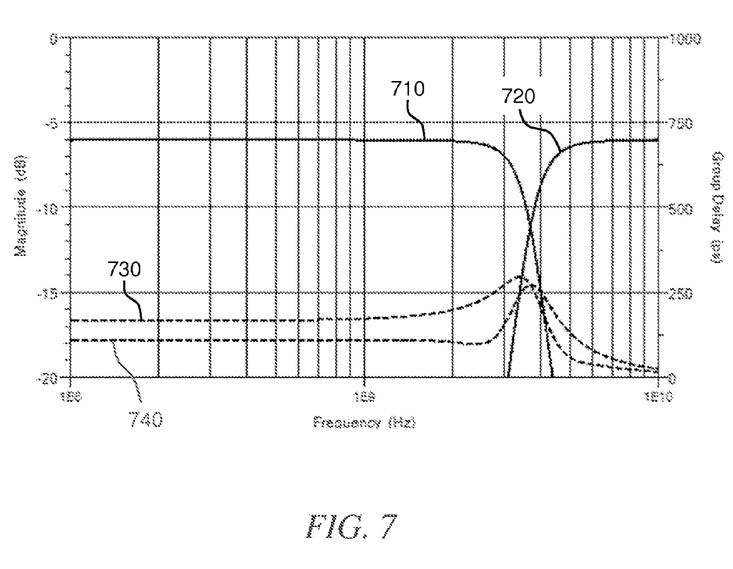
FIG. 7 is a frequency response function according to an embodiment of the present invention.

FIG. 6A depicts an example low pass filter circuit 600 capable of use with the present invention, comprised of an arrangement of capacitor plates 610 and inductors 620. FIG. 6B depicts an example high pass filter 650 circuit capable of use with the present invention, comprised of an arrangement of capacitor plates 610 and inductors 620, a laser diode 630 (the load being driven), and a ground connection 640. FIG. 7 depicts a frequency response function according to an embodiment of the present invention.

Now referring to FIGS. 6A, 6B, and 7, curve 710 plots the gain of the low pass filter circuit 600, which rolls off above 3 GHz. Curve 720 plots the gain of the high pass filter circuit 650, which rolls off below 4.5 GHz. Curves 730 and 740 plot the "group delay" through these circuits, which is a measure of the pulse transmission time from the preamplifier (e.g. the preamplifier 266 of the FPC 262 of FIG. 2) to the head. If the group delay changes with frequency differently for one circuit than the other, then the skew between transitions of the write signal and transitions of the laser driving signal can become undesirably frequency dependent.

Note, in this context "skew" means the time lag (or lead) of transitions of the write signal, relative to corresponding transitions in the laser driving signal. By design, the laser driving signal is usually caused to lead by a certain desired skew, because thermal processes are typically slower than magnetic processes. For example, in certain embodiments transitions in the laser driving signal may preferably lead transitions in the write signal by a desired skew in the range of 50 picoseconds to 300 picoseconds.

However, since in conventional systems the two signals follow different paths along the laminated flexure, with different group delay properties, conventionally the skew can be undesirably sensitive to frequency (i.e. overly frequency dependent skew). According to certain disclosed embodiments of the present invention, the frequency dependency of the skew may be desirably reduced, since the two signals follow the same path along the laminated flexure (and then are differentiated by filters on or near the slider of the write head, according to their different frequencies).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A disk drive comprising:
a disk drive base;
a disk rotatably attached to the disk drive base;
an actuator pivotably attached to the disk drive base, the actuator including an arm;
a suspension assembly attached to the arm, the suspension assembly including a laminated flexure having a plurality of conductive traces;
a write head attached to the laminated flexure, the write head including
a slider;
a write transducer disposed on the slider, the write transducer driven by a first electrical signal that is carried on at least one of the plurality of conductive traces, the first signal being characterized by a first frequency; and
a laser device affixed to the slider, the laser device driven by a second electrical signal that is also carried by the same at least one of the plurality of conductive traces, the second electrical signal being characterized by a second frequency that is different from the first frequency.

2. The disk drive of claim 1, further comprising a power combiner that combines the first and second electrical signals on the at least one of the plurality of conductive traces.

3. The disk drive of claim 2, wherein the power combiner is a Wilkinson power combiner, and wherein the actuator further includes a flexible printed circuit (FPC), and the FPC includes the Wilkinson power combiner.

4. The disk drive of claim 1, further comprising a low pass filter and a high pass filter to separate each of the first and second electrical signals from the at least one of the plurality of conductive traces.

5. The disk drive of claim 4, wherein the high pass filter is disposed on the slider.

6. The disk drive of claim 4, wherein the write transducer is an inductive write transducer that includes a write coil, and wherein the write coil is also a component of the low pass filter.

7. The disk drive of claim 1, wherein the second frequency is greater than the first frequency.

8. The disk drive of claim 7, wherein the second frequency is in the range of 5 GHz to 7 GHz, and the first frequency is in the range of 2 GHz to 4 GHz.

9. The disk drive of claim 8, wherein transitions in the second electrical signal generally lead transitions in the first electrical signal, by a desired skew in the range of 50 picoseconds to 300 picoseconds.

10. The disk drive of claim 7, wherein the second frequency is an integer multiple of the first frequency.

11. The disk drive of claim 1, wherein the laser device is a laser diode.

12. A method to drive a magnetic write transducer and a laser diode of a head in an EAMR disk drive, the head attached to a laminated flexure, the method comprising:
    combining onto a shared electrical conductor of the laminated flexure a write signal characterized by a first frequency, and a laser device driving signal characterized by a second frequency that is different from the first frequency;
    separating based on frequency the write signal from the laser device driving signal.

13. The method of claim 12, wherein the combining is performed by a Wilkinson power combiner circuit.

14. The method of claim 12, wherein the separating is performed by a low pass filter and a high pass filter.

15. The method of claim 12, wherein the second frequency is greater than the first frequency.

16. The method of claim 15, wherein the second frequency is in the range of 5 GHz to 7 GHz, and the first frequency is in the range of 2 GHz to 4 GHz.

17. The method of claim 16, further comprising skewing the laser diode driving signal relative to the write signal, so that transitions in the laser device driving signal generally lead transitions in the write signal by 50 picoseconds to 300 picoseconds.

18. The method of claim 15, wherein the second frequency is an integer multiple of the first frequency.

\* \* \* \* \*